US012331806B2

(12) United States Patent
Jarzabek et al.

(10) Patent No.: US 12,331,806 B2
(45) Date of Patent: Jun. 17, 2025

(54) TELESCOPIC PASSIVE DAMPER (71) Applicant: BeijingWest Industries Co., Ltd., Beijing (CN)

(72) Inventors: Piotr Krzysztof Jarzabek, Wieliczka (PL); Mateusz Szymon Sarapata, Wysoka (PL)

(73) Assignee: BeijingWest Industries Co., Ltd., Beijing (CN)

( * ) Notice: Subject to any disclaimer, the term of this patent is extended or adjusted under 35 U.S.C. 154(b) by 550 days.

(21) Appl. No.: 17/849,715

(22) Filed: Jun. 27, 2022

(65) Prior Publication Data

US 2023/0018887 A1 Jan. 19, 2023

Related U.S. Application Data (60) Provisional application No. 63/221,481, filed on Jul. 13, 2021.

(30) Foreign Application Priority Data

Jun. 8, 2022 (CN) .......................... 202210640010.6

(51) Int. Cl.
*F16F 9/512* (2006.01)
*F16F 9/06* (2006.01)
(52) U.S. Cl.
CPC ............ *F16F 9/5126* (2013.01); *F16F 9/062* (2013.01)
(58) Field of Classification Search
CPC .................. F16F 9/062; F16F 9/0209
(Continued)

(56) References Cited

U.S. PATENT DOCUMENTS 1,780,659 A 11/1930 Wallace
2,606,630 A 8/1952 Rossman
(Continued)

FOREIGN PATENT DOCUMENTS

CN 2665453 Y 12/2004
CN 204553671 U 8/2015
(Continued)

OTHER PUBLICATIONS

The First Office Action and search report issued on Sep. 23, 2023 for counterpart Chinese patent application No. 202210640010.6, along with machine EN translation downloaded from EPO.
(Continued)

*Primary Examiner* — Melanie Torres Williams
(74) *Attorney, Agent, or Firm* — Dickinson Wright PLLC (57) ABSTRACT A damper assembly comprises a monotube damper and a twintube damper in a telescopic configuration. A first piston is connected to a rod and is slidably disposed within a first tube. A second tube and a third tube are each disposed coaxially around the monotube damper, with the third tube disposed within the second tube and defining an annular chamber therebetween. A second piston is connected to an axial end of the first tube dividing an interior of the third tube into an upper chamber and a lower chamber. The second piston defines a twintube passage providing fluid communication therethrough. A base member defines a base passage providing fluid communication between the lower chamber and the annular chamber. A seal selectively blocks fluid flow through the twintube passage or the base passage and based on an axial position of the first tube relative to the second tube.

20 Claims, 7 Drawing Sheets (58) Field of Classification Search
USPC .......................................................... 188/315
See application file for complete search history.

(56) References Cited

U.S. PATENT DOCUMENTS

| | | |
|---|---|---|
| 3,041,061 A | 6/1962 | Funkhouser |
| 3,363,894 A | 1/1968 | Hill |
| 4,235,317 A | 11/1980 | Maciejewski |
| 4,312,499 A | 1/1982 | Wossner et al. |
| 5,249,652 A | 10/1993 | Leitzman et al. |
| 6,619,445 B2 * | 9/2003 | Forster ................... F16F 9/062 188/315 |
| 6,681,906 B1 | 1/2004 | Sasse |
| 7,299,907 B2 | 11/2007 | Ferkany |
| 8,418,820 B2 | 4/2013 | Kim |
| 8,857,579 B2 | 10/2014 | Cultraro |
| 2002/0112931 A1 | 8/2002 | Forster |

FOREIGN PATENT DOCUMENTS

| | | |
|---|---|---|
| CN | 111536186 A | 8/2020 |
| DE | 623154 C * | 12/1935 |
| DE | 102008008268 A1 | 8/2009 |
| DE | 102019108057 A1 | 10/2020 |
| EP | 0267543 A1 | 5/1988 |
| JP | 11336824 A | 12/1999 |
| JP | 3795792 B2 | 7/2006 |

OTHER PUBLICATIONS

Extended European Search Report issued on Mar. 24, 2023 for counterpart European patent application No. 22184183.6.

* cited by examiner

TELESCOPIC PASSIVE DAMPER

CROSS REFERENCE TO RELATED APPLICATIONS

This utility patent application claims the benefit of U.S. Provisional Patent Application No. 63/221,481 filed Jul. 13, 2021, and China Application No. 202210640010.6 filed Jun. 8, 2022, the contents of which are incorporated herein by reference in their entirety.

BACKGROUND OF THE INVENTION

1. Field of the Invention

The present invention relates generally to a damper assembly for a vehicle and, in particular a damper assembly.

2. Description of the Prior Art

Suspension systems are provided to filter or isolate the vehicle's body (sprung portion) from the vehicle's wheels and axles (unsprung portion) when the vehicle travels over vertical road surface irregularities as well as to control body and wheel motion. In addition, suspension systems are also used to maintain an average vehicle attitude to promote improved stability of the vehicle during maneuvering. The typical passive suspension system includes a spring and a damping device in parallel with the spring which are located between the sprung portion and the unsprung portion of the vehicle.

Due to an increase in the complexity of vehicle body and suspension, the length of a shock absorber or damper assembly becomes more and more critical because it has a direct impact in the installation, placement (space) and the cost of the vehicle body.

One such a damper assembly is disclosed in U.S. Pat. No. 6,619,445. The damper assembly comprises a main tube extending along a center axis between a first end and a second end. The main tube defines a fluid chamber extending therebetween for containing a working fluid. A main piston is slidably disposed in the fluid chamber dividing the fluid chamber in to a compression chamber and a rebound chamber. A piston rod extends along the center axis and coupled to the main piston for moving the main piston between a compression stroke and a rebound stroke. An external tube, radially spaced apart from the main tube, extends about the main tube between a closed end and an opened end. The closed end is adjacent the first end. The opened end is adjacent to the second end. The external tube and the main tube define a compensation chamber extending therebetween.

SUMMARY OF THE INVENTION

The present invention provides a damper assembly. The damper assembly comprises a monotube damper and a twintube damper in a telescopic configuration. The monotube damper includes a first tube, a rod disposed at least partially within the first tube and coaxially therewith, and a first piston connected to the rod and slidably disposed within the first tube. The twintube damper includes a second tube and a third tube each disposed coaxially around the monotube damper, the second tube having an upper end and a closed lower end opposite from the upper end, and the third tube disposed within the second tube and defining an annular chamber therebetween. The twintube damper includes a second piston connected to an axial end of the first tube dividing an interior of the third tube into an upper twintube chamber and a lower twintube chamber, the second piston defining a twintube passage providing fluid communication between the upper twintube chamber and the lower twintube chamber. The twintube damper also includes a base valve having a base member disposed adjacent to the closed lower end of the second tube and defining at least one base passage therethrough and providing fluid communication between the lower twintube chamber and the annular chamber. The damper assembly also includes a seal configured to selectively block fluid flow through one of the twintube passage or the base passage and based on an axial position of the first tube relative to the second tube.

The present invention provides a damper assembly. The damper assembly comprises a monotube damper and a twintube damper in a telescopic configuration. The monotube damper includes a first tube, a rod disposed at least partially within the first tube and coaxially therewith, and a first piston connected to the rod and slidably disposed within the first tube. The twintube damper includes a second tube and a third tube each disposed coaxially around the monotube damper, the second tube having an upper end and a closed lower end opposite from the upper end, and the third tube disposed within the second tube and defining an annular chamber therebetween. The twintube damper includes a second piston connected to an axial end of the first tube dividing an interior of the third tube into an upper twintube chamber and a lower twintube chamber, the second piston defining a twintube passage providing fluid communication between the upper twintube chamber and the lower twintube chamber. The twintube damper also includes a base valve having a base member disposed adjacent to the closed lower end of the second tube and defining at least one base passage therethrough and providing fluid communication between the lower twintube chamber and the annular chamber. The damper assembly also includes a seal configured to selectively block fluid flow through the twintube passage of the second piston based on an axial position of the first tube relative to the second tube.

The present invention provides a damper assembly. The damper assembly comprises a monotube damper and a twintube damper in a telescopic configuration. The monotube damper includes a first tube, a rod disposed at least partially within the first tube and coaxially therewith, and a first piston connected to the rod and slidably disposed within the first tube. The twintube damper includes a second tube and a third tube each disposed coaxially around the monotube damper, the second tube having an upper end and a closed lower end opposite from the upper end, and the third tube disposed within the second tube and defining an annular chamber therebetween. The twintube damper includes a second piston connected to an axial end of the first tube dividing an interior of the third tube into an upper twintube chamber and a lower twintube chamber, the second piston defining a twintube passage providing fluid communication between the upper twintube chamber and the lower twintube chamber. The twintube damper also includes a base valve having a base member disposed adjacent to the closed lower end of the second tube and defining at least one base passage therethrough and providing fluid communication between the lower twintube chamber and the annular chamber. The damper assembly also includes a seal configured to selectively block fluid flow through the base passage of the base member based on an axial position of the first tube relative to the second tube.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 3A-3E show cutaway views of the damper assembly of FIG. 1 at various positions in a compression stroke;

FIGS. 4A-4E show cutaway views of the damper assembly of FIG. 1 at various positions in a rebound stroke;

FIGS. 6A-6E show cutaway views of the damper assembly of FIG. 5 at various positions in a compression stroke.

FIGS. 7A-7E show cutaway views of the damper assembly of FIG. 5 at various positions in a rebound stroke.

DESCRIPTION OF THE ENABLING EMBODIMENTS

Referring to the Figures, wherein like numerals indicate corresponding parts throughout the several views, a damper assembly 20, 220 is provided. The damper assembly 20, 220 may also be called a shock absorber, and may be used as part of a suspension system in a motor vehicle, such as a car or truck. The damper assembly 20, 220 of the present disclosure may minimizes damper overall length while maintaining the same stroke length. The damper assembly 20, 220 of the present disclosure also provides simplified design when compared with some conventional dampers, which lowers the cost of the vehicle body.

The damper assembly 20, 220 is designed to have a relatively small body with a maximized stroke. When compared with conventional dampers, the damper assembly 20, 220 may have considerably shorter compressed length while keeping a similar or equal stroke. The damper assembly 20, 220 of the present disclosure may provide many benefits at the vehicle level. It may provide for a more compact rear suspension, allowing passenger and light commercial vehicles to have additional space for a trunk and/or for batteries (e.g. in electrified vehicles).

The damper assembly 20, 220 of the present disclosure utilizes a two-piece (telescopic) rod including a first rod and a second rod in the form of a moving monotube. The damper assembly 20, 220 of the present disclosure may incorporate existing parts and existing assembly designs, with some additional components and design aspects. The damper assembly 20, 220 of the present disclosure may incorporate a concept of a damper with a divided scope of work. The first rod and the second rod may not move simultaneously, but in sequence. The monotube damper may provide damping and simultaneously function as the second rod for the twintube damper, which also provides a damping function.

Movement of the first rod and the second rod (monotube) is realized sequentially by the appropriate selection of valve characteristics: monotube piston valve, twin-tube piston valve, and base valve—by properly tuning of the valves. There are two separated oil chambers—a mono-tube oil chamber and a twin-tube oil chamber.

The damper assembly 20, 220 of the present disclosure may provide several advantages over conventional dampers. It may provide a compressed length that is approximately 20% shortened compared to conventional twin tube dampers having a similar extended length. The damper assembly 20, 220 of the present disclosure includes design aspects and components based on proven solutions and technologies of monotube and twin tube dampers. The damper assembly 20, 220 of the present disclosure provides for temperature compensation by incorporating two separated gas chambers. The damper assembly 20, 220 of the present disclosure may exhibit no cavitation phenomena on both sides (caused by temperature influence oil volume), and no multiplication of force from gas. It does not exhibit any high-pressure build-up with rebound movement. The damper assembly 20, 220 of the present disclosure provides is much simpler than other, competing designs, with less seals and guiding parts.

Figure 1:
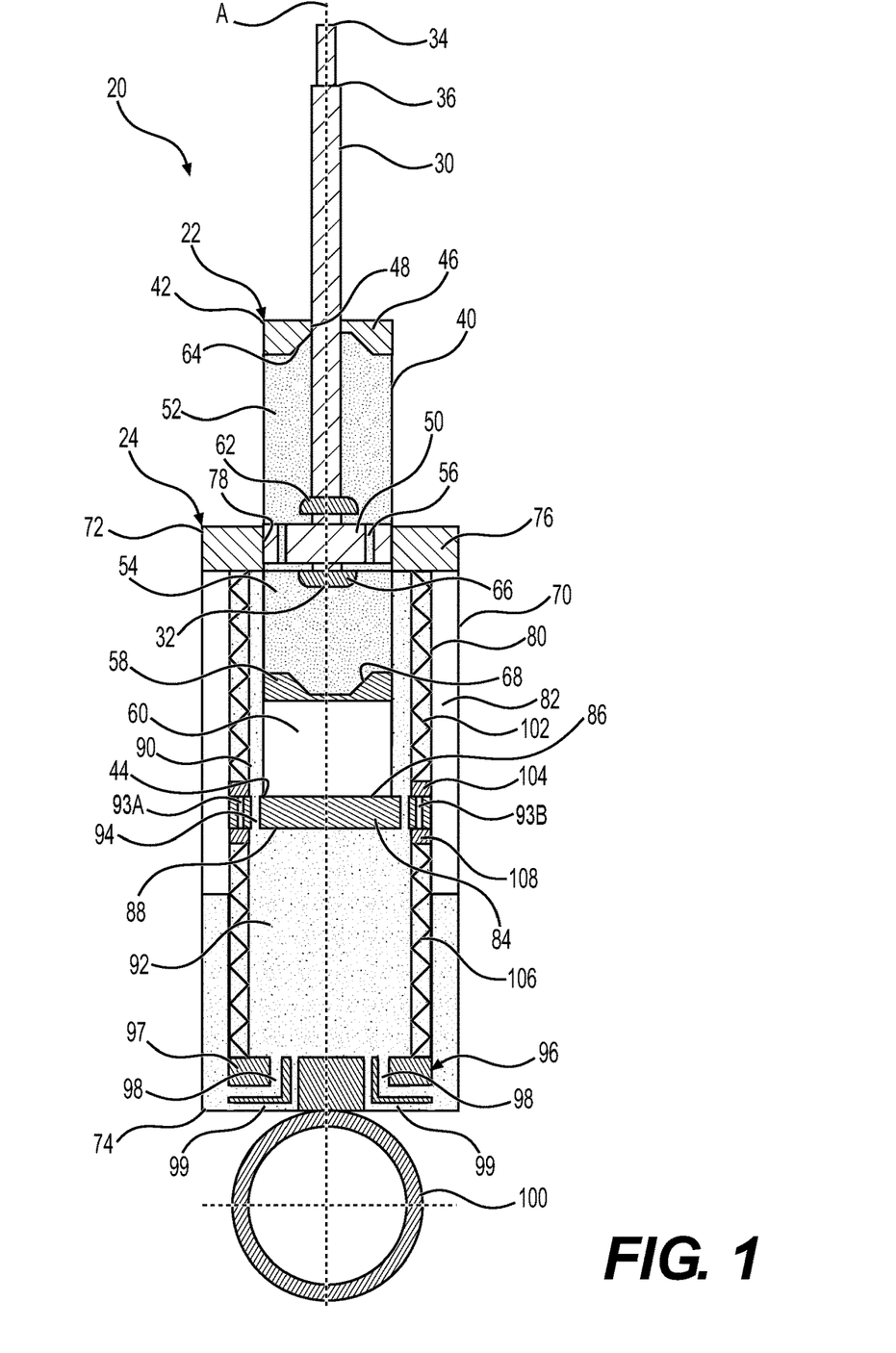
FIG. 1 is a cutaway view of a damper assembly in accordance with one embodiment of the present invention.

FIG. 1 is a cutaway view of a first damper assembly 20 in accordance with an embodiment of the present invention. The first damper assembly 20 includes a monotube damper 22 and a first twintube damper 24 in a telescopic configuration.

The monotube damper 22 includes a first rod 30 extending along an axis A and translatable along the axis A. The first rod 30 includes a proximal end 32 and a distal end 34 spaced apart from the proximal end 32 along the axis A. The first rod 30 includes a shoulder 36 spaced apart from the distal end 34 and configured for attachment to an external structure, such as a suspension component or a chassis-mounted bracket on a vehicle. In some embodiments, the first rod 30 may include an external threading (not shown) between the distal end 34 and the shoulder 36 for attachment to the external structure. The monotube damper 22 also includes a first tube 40 having a tubular shape coaxial with the axis A and having a first end 42 and a second end 44 opposite from the first end 42. A first cap 46 is disposed within the first tube 40 adjacent the first end 42, providing a fluid-tight seal. The first cap 46 defines a first bore 48, and the first rod 30 passes through the first bore 48 in a fluid-tight seal, and configured to allow the first rod 30 to translate along the axis A relative to the first tube 40.

A first piston 50 is slidably disposed within the first tube 40 and connected to the first rod 30 adjacent to the proximal end 32. The first piston 50 divides the interior of the first tube 40 into a first chamber 52 and a second chamber 54. The first chamber 52 extends between the first cap 46 and the first piston 50. The second chamber 54 is on an opposite side of the first piston 50 from the first chamber 52. The first piston 50 includes one or more monotube passages 56 extending therethrough, providing fluid communication between the first chamber 52 and the second chamber 54. Fluid may be channeled through the monotube passages 56 as the first piston 50 is moved through the first tube 40 to provide a damping function of the monotube damper 22.

In some embodiments, the first piston 50 may include one or more discs or other structures (not shown in the FIGS.) to selectively limit fluid flow through the monotube passages 56 in a compression direction and/or in a rebound direction.

A gas cup 58 is disposed within the first tube 40, between the first piston 50 and the second end 44. The gas cup 58 may define a third chamber 60 extending between the gas cup 58 and the second end 44 of the first tube 40. The gas cup 58 may be fluid-tight to separate the second chamber 54, from the third chamber 60. The first chamber 52 and the second chamber 54 may contain a liquid, such as oil, and the third chamber 60 may contain a gas. In some embodiments, the gas cup 58 may be movable within the first tube 40 to compress the gas in the third chamber 60 in response to a compressive force on the first rod 30 to provide a spring function of the monotube damper 22 and compensation for oil volume change with temperature.

A first ring 62 is disposed around the first rod 30 adjacent to the first piston 50 and configured to engage the first cap 46 to smooth end of rebound movement by increasing a rebound damping force adjacent to an end of travel position of the first rod 30 in a rebound direction (i.e. outwardly from the first tube 40). Additionally or alternatively, the first ring 62 may limit travel of the first rod 30 outwardly from the first tube 40. The first cap 46 includes first slots 64 defining a smooth end-rebound chamber configured to receive the first ring 62 when the first rod 30 is in a fully extended position, with the first piston 50 adjacent to the first cap 46. The first ring 62 and the first slots 64 may function together as a hydraulic rebound stop.

A second ring 66 is disposed around the proximal end 32 of the first rod 30 and configured to engage the gas cup 58 for smoothing end of compression movement by increasing a compression damping force adjacent to an end of travel position of the first rod 30 in a compression direction (i.e. into the first tube 40). Additionally or alternatively, the second ring 66 may limit travel of the first rod 30 into the first tube 40. The gas cup 58 includes second slots 68 defining a smooth end-compression chamber configured to receive the second ring 66 when the first rod 30 is in a fully inserted position, with the first piston 50 adjacent to the gas cup 58. The second ring 66 and the second slots 68 may function together as a hydraulic compression stop. The rings 62, 66 may help to provide a smooth transition from a low level of damping (low forces from monotube-only damping) to a high level of damping (high forces from twintube+monotube damping).

The first twintube damper 24 includes a second tube 70 having a tubular shape coaxial with the axis A and having an upper end 72 and a lower end 74 opposite from the upper end 72. The second tube 70 is closed at the lower end 74. A second cap 76 is disposed within the second tube 70 adjacent the upper end 72, providing a fluid-tight seal. The second cap 76 defines a second bore 78, and the first tube 40 passes through the second bore 78 in a fluid-tight seal, and configured to allow the first tube 40 to translate along the axis A relative to the second tube 70. The first tube 40 of the monotube damper 22, therefore, functions as a second rod in the twintube damper 24. The first twintube damper 24 also includes a third tube 80 having a tubular shape coaxial with the axis A and located inside of the second tube 70. The third tube 80 has an outside diameter that is smaller than an inside diameter of the second tube 70, providing an annular chamber 82 between the second tube 70 and the third tube 80.

The first twintube damper 24 also includes a second piston 84 connected to the second end 44 of the first tube 40. The second piston 84 is disposed within the third tube 80 and in sealing engagement with an interior surface of the third tube 80. The second piston 84 may enclose the third chamber 60 of the first tube 40, preventing gas from escaping therefrom. The second piston 84 includes a top face 86 facing toward the second cap 76, and a bottom face 88, facing opposite the top face 86. The second piston 84 divides the interior of the third tube 80 into an upper twintube chamber 90 and a lower twintube chamber 92. The upper twintube chamber 90 extends between the second cap 76 and the second piston 84. The second piston 84 includes one or more first selective twintube passages 93A, one or more second selective twintube passages 93B extending therethrough, with each of the selective twintube passages 93A, 93B selectively providing fluid communication between the upper twintube chamber 90 and the lower twintube chamber 92. The second piston 84 includes one or more invariable twintube passages 94 extending therethrough, with each of the invariable twintube passages 94 providing fluid communication between the upper twintube chamber 90 and the lower twintube chamber 92. Fluid may be channeled through either or both of the selective twintube passages 93A, 93B and/or the invariable twintube passages 94 as the second piston 84 is moved through the third tube 80 to provide a damping function of the twintube damper 24. In some embodiments, the second piston 84 may include one or more discs or other structures to selectively limit fluid flow through the selective twintube passages 93A, 93B and/or the invariable twintube passages 94 as the second piston 84 moves through the third tube 80 in either or both of a compression direction or a rebound direction.

The first twintube damper 24 also includes a first base valve 96 disposed within the second tube 70 and adjacent to the lower end 74. The first base valve 96 includes a first base member 97 that defines a plurality of first base compression passages 98 providing fluid communication between the lower twintube chamber 92 and the annular chamber 82 in compression movement. Fluid may be channeled through the first base passages 98 as the second piston 84 is moved through the third tube 80 (in compression movement) to provide a further damping function of the twintube damper 24. The first base valve 96 includes also first base rebound passages 99 providing fluid communication between the annular chamber 82 and the lower twintube chamber 92 in rebound movement. In some embodiments, the first base valve 96 may include one or more discs or other structures to selectively limit fluid flow through the first base compression passages 98 and first base rebound passages 99. The first base passages 98 may be called position-independent base passages, and the amount of fluid flow therethrough may be independent of the axial an axial position of the first tube 40 relative to the second tube 70. These position-independent base passages are contrasted with second base passages 298, discussed below with reference to FIG. 5, and which have flow characteristics varies depending on an axial position of the first tube 40 relative to the second tube 70.

The first damper assembly 20 includes a mounting ring 100 (or another element that allows the mounting of the shock absorber in the suspension) attached to the closed lower end 74 of the second tube 70. The mounting ring 100 may be attached to a second external structure, such as a suspension component or a chassis-mounted bracket on a vehicle.

The first twintube damper 24 also includes a first compressive member 102 with a first seal 104 located in the upper twintube chamber 90 and extending from the second cap 76 to a top face 86 of second piston 84. The first compressive member 102 with the first seal 104 may be fixed to the second cap 76, and the first seal 104 may be free to selectively engage the second piston 84, thereby strengthening damping forces in the rebound direction. The first compressive member 102 may include a coil spring. Additionally or alternatively, the first compressive member 102 may include a resilient material, such as rubber or foam. When the first twintube damper 24 is in a nominal position, as shown in FIG. 1, (or any further extended position) the first seal 104 contacts the top face 86 of the second piston 84 and covers only the second selective twintube passages 93B, thereby restricting fluid flow therethrough. When the twin tube damper 24 is any further compressed position (starting from nominal position, as shown in FIG. 1.), the first seal 104 is no longer in contact with the top face 86 of the second piston 84, and does not cover the second selective twintube passages 93B. Therefore, the first seal 104 ceases to restrict fluid flow through the second piston 84 as the twin tube damper 24 is compressed from the nominal position. The first seal 104 may have an annular or ring shape. In some embodiments, the first seal 104 may be disposed within and adjacent to an interior surface of the third tube 80. However, the first seal 104 may have a different shape, size, and/or position.

The first twintube damper 24 also includes a second compressive member 106 with a second seal 108 located in the lower twintube chamber 92 and extending from the first base valve 96 to bottom surface 88 of the second piston 84. The second compressive member 106 with the second seal 108 may be fixed to the first base valve 96, and the second seal 108 may be free to selectively engage the second piston 84, thereby strengthening damping forces in the compression direction. The second compressive member 106 may include a coil spring. Additionally or alternatively, the second compressive member 106 may include a resilient material, such as rubber or foam. When the first twintube damper 24 is in a nominal position, as shown in FIG. 1, (or any further compressed position) the second seal 108 contacts the bottom face 88 of the second piston 84 and covers only the first selective twintube passages 93A, thereby restricting fluid flow therethrough, and simultaneously strengthening of damping forces of the second piston 84. When the twin tube damper 24 is any further extended position (starting from nominal position, as shown in FIG. 1.), the second seal 108 is no longer in contact with the bottom face 88 of the second piston 84, and does not cover the first selective twintube passages 93A. Therefore, the second seal 108 ceases to restrict fluid flow through the second piston 84 as the twin tube damper 24 is extended in a rebound direction from the nominal position. The second seal 108 may have an annular or ring shape. In some embodiments, the second seal 108 may be disposed within and adjacent to an interior surface of the third tube 80. However, the second seal 108 may have a different shape, size, and/or position.

Figures 2A, 2B:
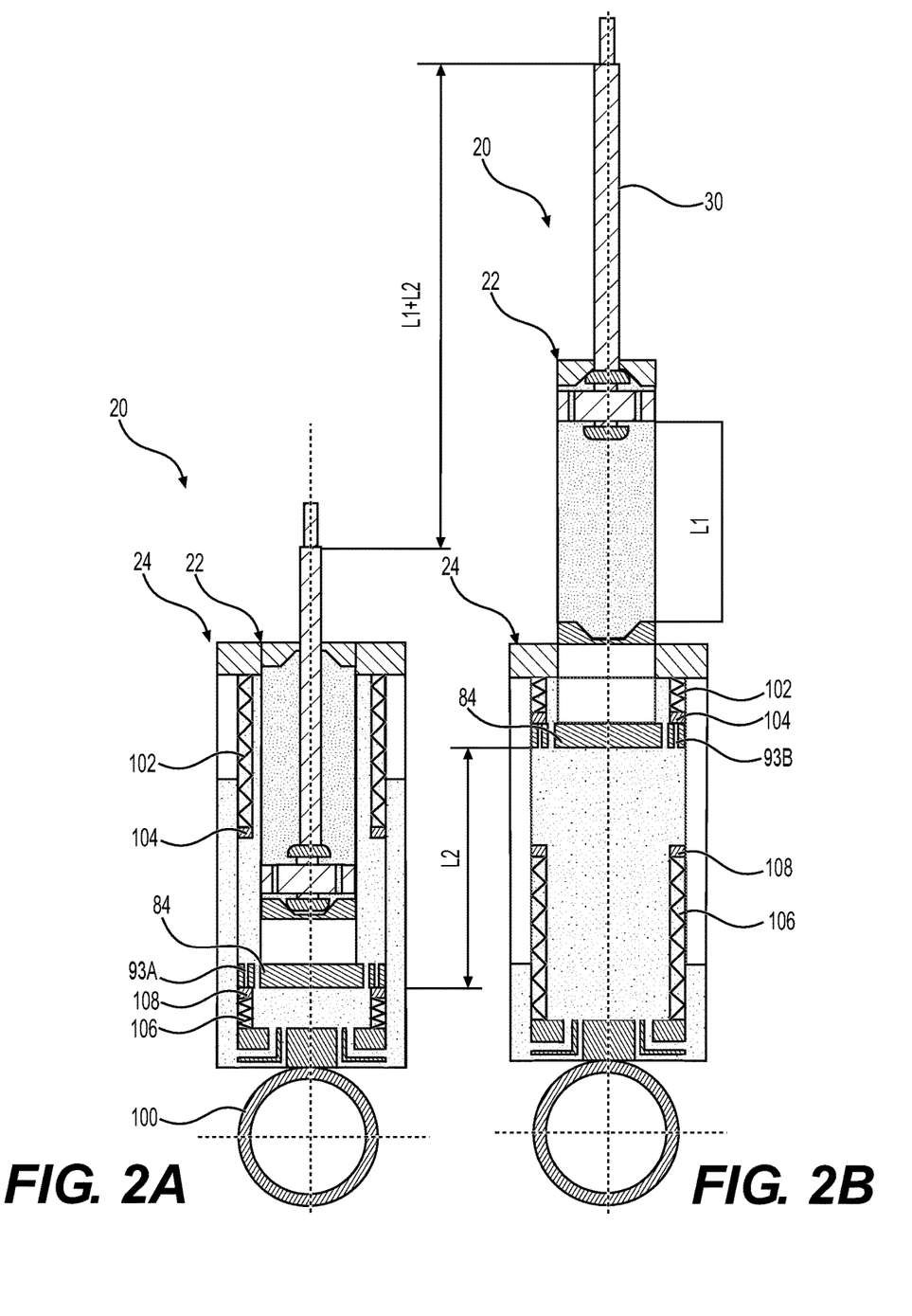
FIG. 2A is a cutaway view of the damper assembly of FIG. 1, in a compressed position.
FIG. 2B is a cutaway view of the damper assembly of FIG. 1, in an extended position.

FIG. 2A shows the first damper assembly 20 in a compressed position. As the first damper assembly 20 is compressed from its nominal position, the monotube damper 22 may first be compressed. When the monotube damper 22 is compressed beyond a predetermined (maximum) amount, the first twintube damper 24 may then compress. When the second piston 84 of the first twintube damper 24 is moved from its nominal position and downwardly toward the mounting ring 100 (or other mounting section/part), the second compressive member 106 with the second seal 108 is compressed, and the first compressive member 102 with the first seal 104 is spaced apart from the second piston 84.

FIG. 2B shows the first damper assembly 20 in an extended position. As the first damper assembly 20 is extended from its nominal position, the monotube damper 22 may first be extended. When the monotube damper 22 is extended beyond a predetermined (maximum) amount, the first twintube damper 24 may then extend. When the second piston 84 of the first twintube damper 24 is moved from its nominal position and upwardly away from the mounting ring 100 (or other mounting section/part), the first compressive member 102 with the first seal 104 is compressed, and the second compressive member 106 with the second seal 108 is spaced apart from the second piston 84.

The full stroke of the telescopic damper assembly "L" is provided by: the stroke of the monotube piston rod (i.e. first rod 30) "L1"+the stroke of the "twintube piston rod" (i.e. first tube 40) "L2".

As shown in FIGS. 2A-2B, the second seal 108 selectively blocks fluid flow through the first selective twintube passages 93A based on an axial position of the first tube 40 relative to the second tube 70, with the twintube damper 24 compressed beyond a given position where the second seal 108 contacts the second piston 84. Likewise, the first seal 104 selectively blocks fluid flow through the second selective twintube passages 93B based on an axial position of the first tube 40 relative to the second tube 70, with the twintube damper 24 extended beyond a given position where the first seal 104 contacts the second piston 84.

Figure 3A:
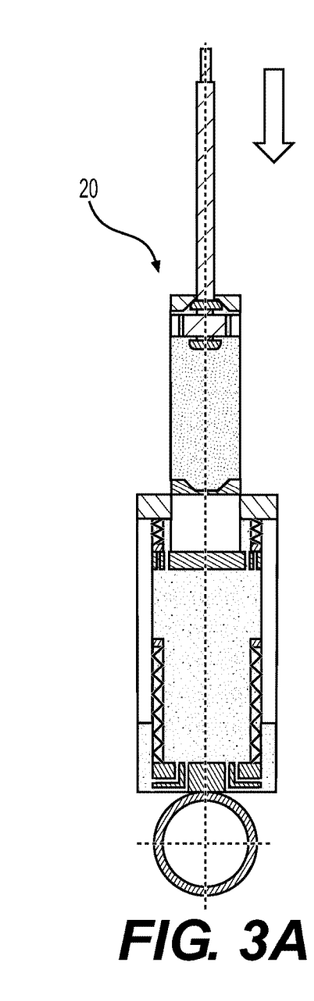
Figure 3B:
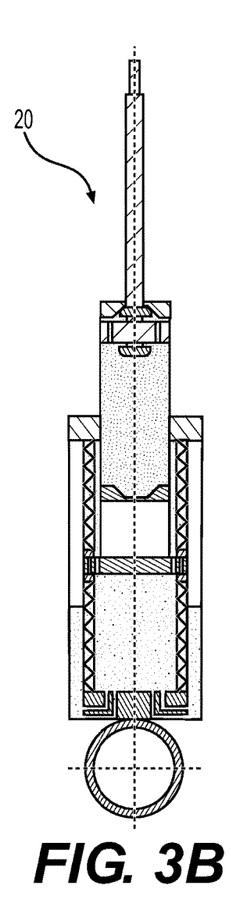
Figure 3C:
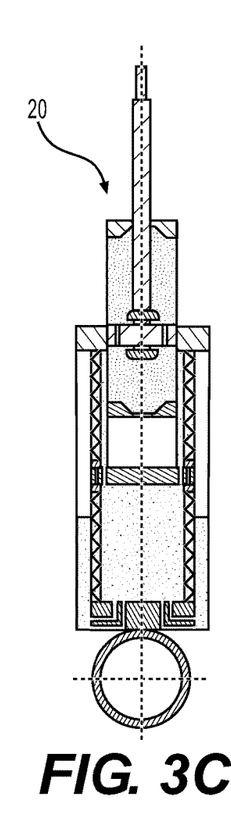
Figure 3D:
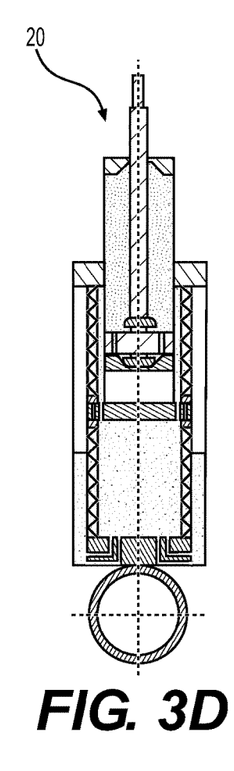
Figure 3E:
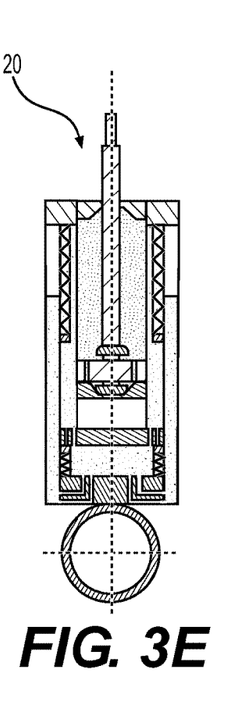

FIGS. 3A-3E show cutaway views of the first damper assembly 20 at various positions in a compression stroke. Specifically, FIG. 3A shows the first damper assembly 20 in a full-extended position; FIG. 3B shows the first damper assembly 20 in mid-extended position; FIG. 3C shows the first damper assembly 20 in nominal position, which may be midway between full extended and full-compressed positions; FIG. 3D shows the first damper assembly 20 in mid-compressed position; and FIG. 3E shows the first damper assembly 20 in a compressed position.

Compressing the first damper assembly 20 from the full-extended position to the mid-extended position may include a force due to a valve restriction of the second piston 84 (which is not supported by the second compressive member 106) plus a force due to restriction of the first base valve 96 to be less than the force due to a valve restriction of the first piston 50 of the monotube damper 22. Thus, the first twintube damper 24 may be compressed to its nominal position before the monotube damper 22 moves from its fully-extended position. After the first twintube damper 24 is compressed to its nominal position, the second piston 84 stops contacting the first seal 104 and starts contacting the second seal 108. At this point, the first twintube damper 24 has increased damping force due to the second piston 84 being reinforced by force applied by the second seal 108 and by the second seal 108 restricting fluid flow therethrough. With the first twintube damper 24 having the increased damping force, compressive force applied to the first rod 30 causes the monotube damper 22 to move from its fully-extended position to its nominal position, and then to the full-compressed position, with the first piston 50 spaced away from the first cap 46.

Compressing the first damper assembly 20 beyond the nominal position may include the force due to the valve restriction of the first piston 50 to be less than the force due to the valve restriction of the second piston 84, supported by the second compressive member 106 with the second seal 108, plus the force due to restriction of the first base valve 96. Thus, the monotube damper 22 may continue to be compressed until the monotube damper 22 is in a full-compressed position with the proximal end 32 of the first rod 30 and the second ring 66 contacting the gas cup 58. Only then may the first twintube damper 24 may be compressed beyond its nominal position.

Figure 4A:
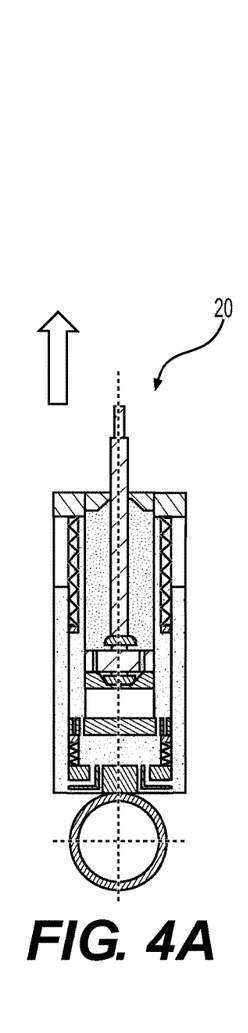
Figure 4B:
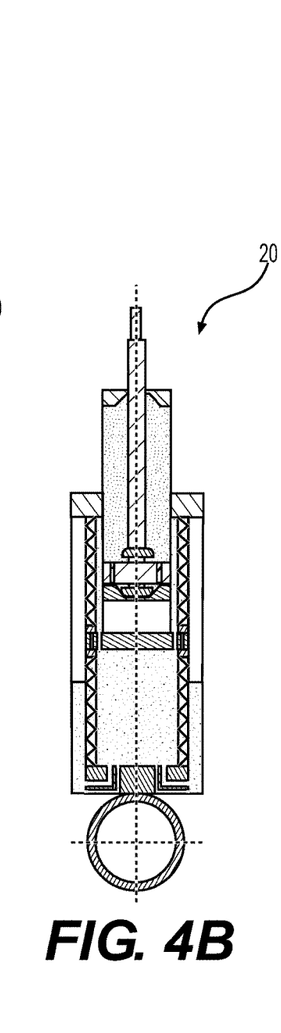
Figure 4C:
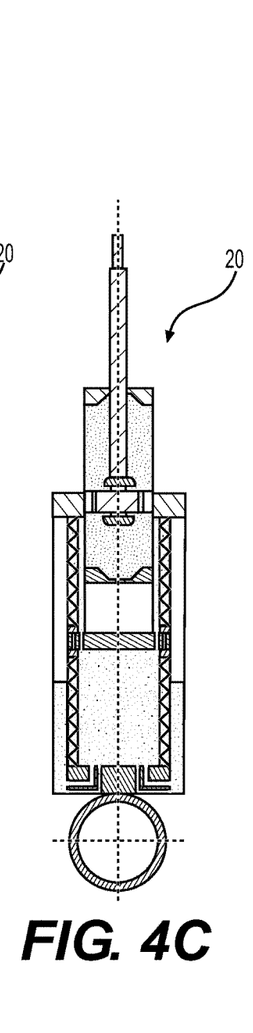
Figure 4D:
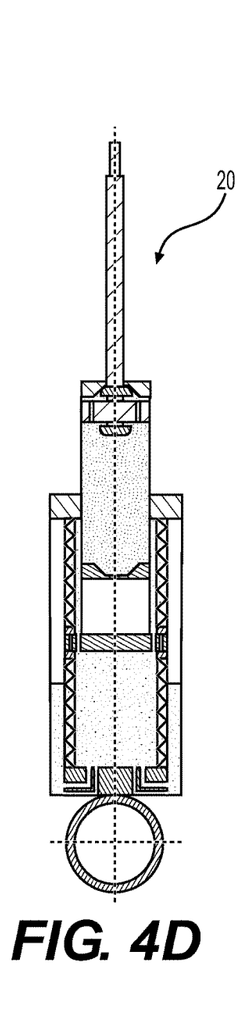
Figure 4E:
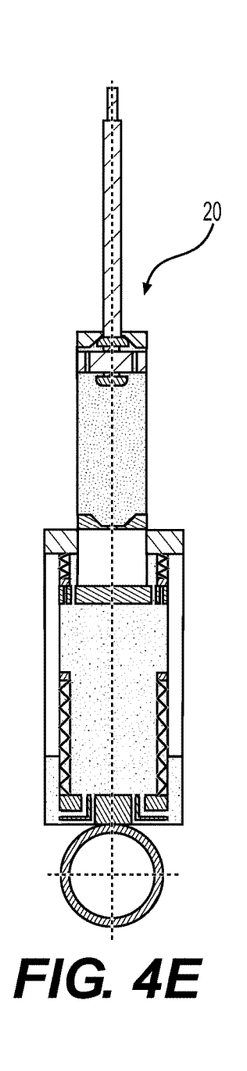

FIGS. 4A-4E show cutaway views of the damper assembly of FIG. 1 at various positions in a rebound stroke. Specifically, FIG. 4A shows the first damper assembly 20 in a full-compressed position; FIG. 4B shows the first damper assembly 20 in mid-compressed position; FIG. 4C shows the first damper assembly 20 in nominal position, which may be midway between full extended and full-compressed positions; FIG. 4D shows the first damper assembly 20 in mid-extended position; and FIG. 4E shows the first damper assembly 20 in a full-extended position.

Figure 5:
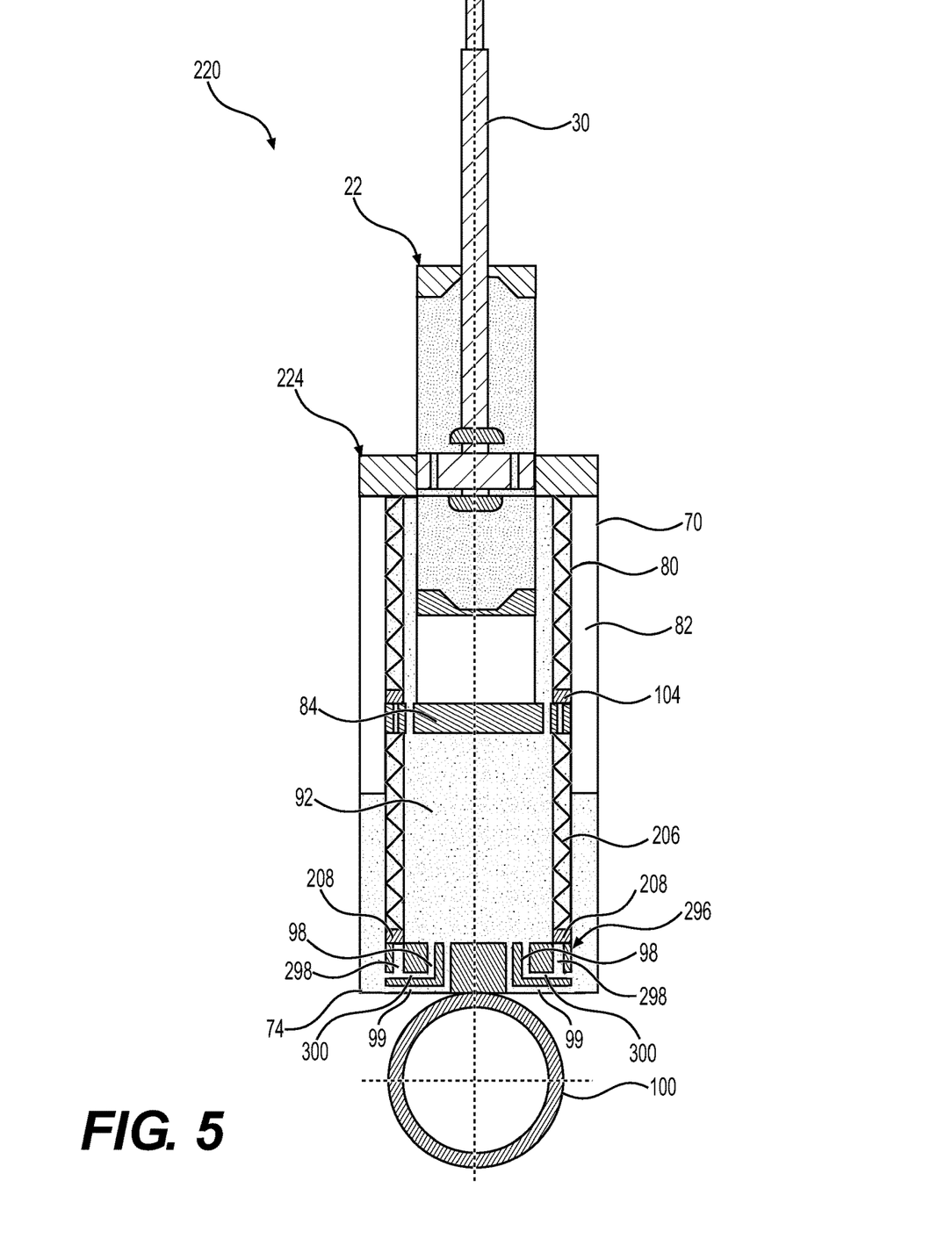
FIG. 5 is a cutaway view of a damper assembly in accordance with an embodiment of the present invention.

FIG. 5 is a cutaway view of a second damper assembly 220 in accordance with an embodiment of the present invention. The second damper assembly 220 includes a monotube damper 22 and a second twintube damper 224 in a telescopic configuration. The monotube damper 22 of the second damper assembly 220 may be similar or identical to the monotube damper 22 of the first damper assembly 20. The second twintube damper 224 of the second damper assembly 220 may be similar or identical to the first twintube damper 24 of the first damper assembly 20, with a few differences described herein. In place of the first base valve 96, the second twintube damper 224 of the second damper assembly 220 includes a second base valve 296 disposed within the second tube 70 and adjacent to the lower end 74. Like the first base member 97 of the first base valve 96, the second base valve 296 includes a second base member 297 that defines a plurality of first base passages 98 providing fluid communication between the lower twintube chamber 92 and the annular chamber 82. In some embodiments, the second base valve 296 may include one or more discs or other structures to selectively limit fluid flow through the first base passages 98. The second base member 297 also defines a plurality of second base passages 298 providing fluid communication between the lower twintube chamber 92 and the annular chamber 82. Fluid may be channeled through the first base passages 98 and/or the second base passages 298 as the second piston 84 is moved through the third tube 80 to provide a damping function of the second twintube damper 224. One or more of the first base passages 98 and one or more of the second base passages 298 may share a common section, such as a common radial passage 300 shown on FIG. 5.

In place of the second compressive member 106 and the second seal 108, the second twintube damper 224 includes a third compressive member 206 and a third seal 208. The compressive member 206 is located in the lower twintube chamber 92 and extends from the second piston 84 toward the second base valve 296. The third seal 208 is attached to the third compressive member 206 and located between the third compressive member 206 and the second base valve 296. The third compressive member 206 may be fixed to the second piston 84, and the third seal 208 may be free to selectively engage the second base valve 296, thereby strengthening damping forces in the compression direction. The third compressive member 206 may include a coil spring. Additionally or alternatively, the third compressive member 206 may include a resilient material, such as rubber or foam. When the second twintube damper 224 is in a nominal position, as shown in FIG. 5, (or any further compressed position) the third seal 208 contacts the second base valve 296 and covers the one or more of the second base passages 298, thereby restricting fluid flow therethrough. When the second twintube damper 224 is in any further extended position (from the nominal position), the third seal 208 is no longer contact with the second base valve 296 and does not cover the one or more of the second base passages 298. Therefore, the third seal 208 ceases to restrict fluid flow through the second base valve 296 as the second twintube damper 224 is extended in the rebound direction from the nominal position. The third seal 208 may have an annular or ring shape. In some embodiments, the third seal 208 may be disposed within and adjacent to an interior surface of the third tube 80. However, the third seal 208 may have a different shape, size, and/or position.

As shown in FIG. 5, the third seal 208 selectively blocks fluid flow through the second base passages 298 based on an axial position of the first tube 40 relative to the second tube 70, with the twintube damper 24 compressed beyond a given position.

Figure 6A:
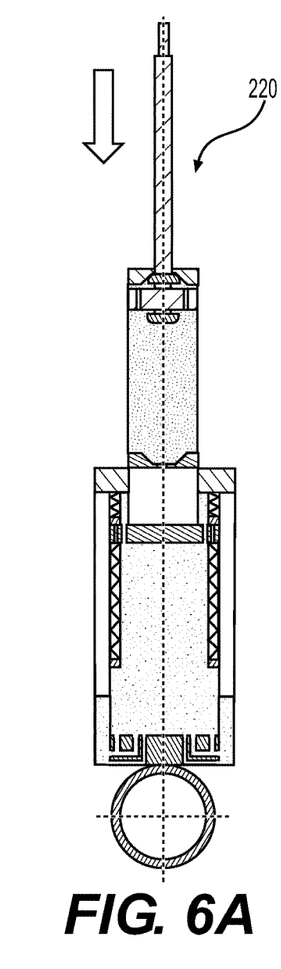
Figure 6B:
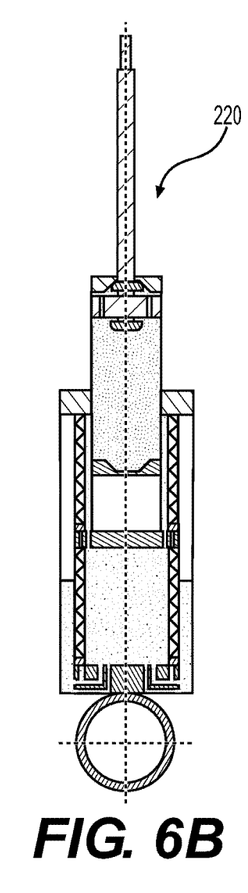
Figure 6C:
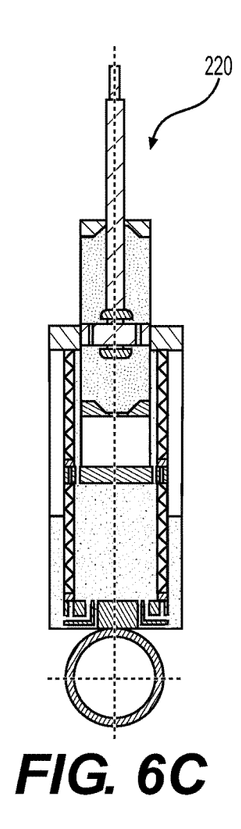
Figure 6D:
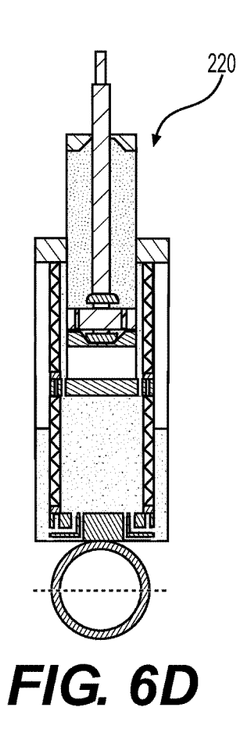
Figure 6E:
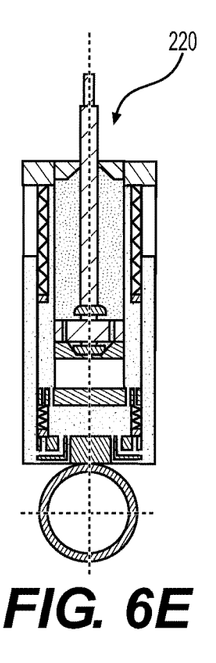

FIGS. 6A-6E show cutaway views of the second damper assembly 220 at various positions in a compression stroke. Specifically, FIG. 6A shows the second damper assembly 220 in a full-extended position; FIG. 6B shows the second damper assembly 220 in mid-extended position; FIG. 6C shows the second damper assembly 220 in nominal position, which may be midway between full extended and full-compressed positions; FIG. 6D shows the second damper assembly 220 in mid-compressed position; and FIG. 6E shows the second damper assembly 220 in a full compressed position.

Compressing the second damper assembly 220 from the full-extended position to the mid-extended position may include a force due to restrictions of the second piston 84 and the second base valve 296 (which is not supported by the second compressive member 206 with the third seal 208) to be less than the force due to a valve restriction of the first piston 50 of the monotube damper 22. Thus, the second twintube damper 224 may be compressed to its nominal position before the monotube damper 22 moves from its fully-extended position. After the second twintube damper 224 is compressed to its nominal position, with the third seal 208 contacting the second base valve 296, the monotube damper 22 may move from its fully-extended position to its nominal position, and then to the full-compressed position with the first piston 50 spaced away from the first cap 46. In other words, when the second twintube damper 224 is compressed to its nominal position, the second compressive member 206 with the third seal 208 increases the damping force of the second twintube damper 224. This increased damping force is caused by a combination of the second compressive member 206 being compressed and an increased damping force produced by the second base valve 296 (due to the third seal 208 restricting fluid flow therethrough). With the second twintube damper 224 in this configuration, compressive force applied to the first rod 30 may cause the monotube damper 22 to move from its fully-extended position to its nominal position and then to full-compressed position.

Compressing the second twintube damper 224 of the second damper assembly 220 beyond its nominal position may include the force due to the valve restriction of the first piston 50 to be less than the damping force of the second twintube damper 224 due to the valve restriction of the second piston 84, and with second base valve 296 supported by the third compressive member 206 with the third seal 208. Thus, the monotube damper 22 may continue to be compressed until the monotube damper 22 is in a full-compressed position with the proximal end 32 of the first rod 30 or the second ring 66 contacting the gas cup 58. Only then may the second twintube damper 224 may be compressed beyond its nominal position.

Figure 7A:
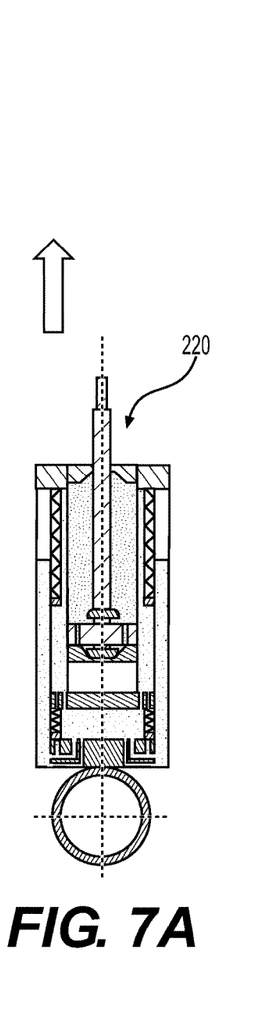
Figure 7B:
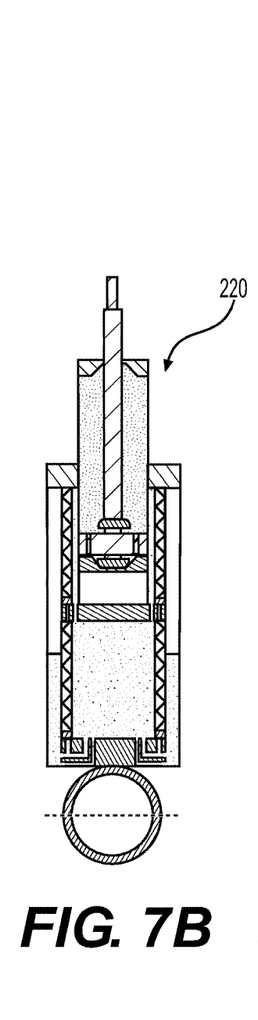
Figure 7C:
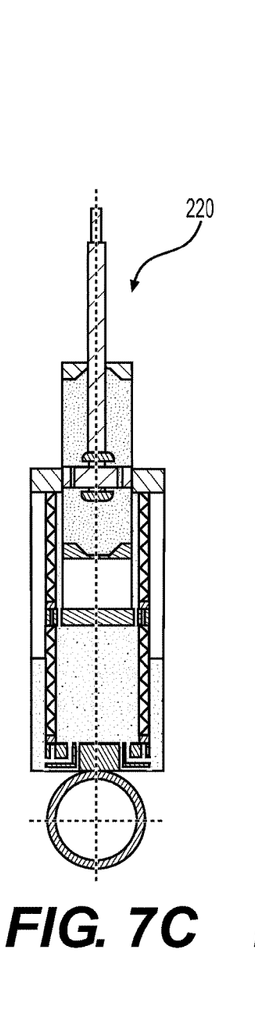
Figure 7D:
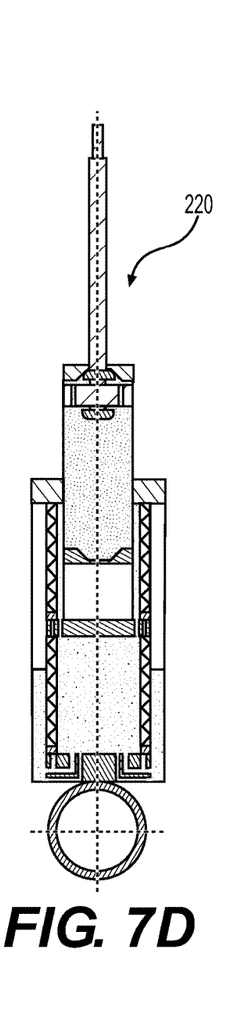
Figure 7E:
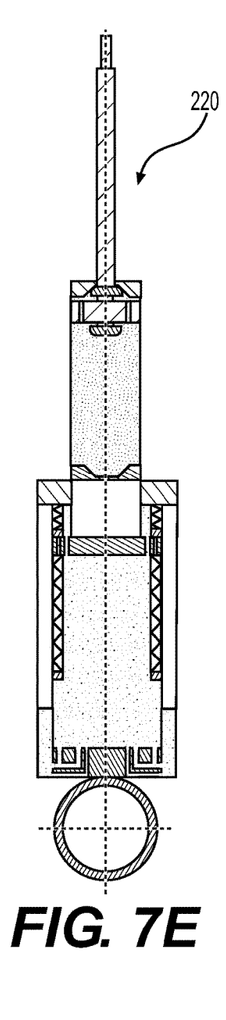

FIGS. 7A-7E show cutaway views of the second damper assembly 220 at various positions in a rebound stroke. Specifically, FIG. 7A shows the second damper assembly 220 in a compressed position; FIG. 7B shows the second damper assembly 220 in mid-compressed position; FIG. 7C shows the second damper assembly 220 in nominal position, which may be midway between full extended and full-compressed positions; FIG. 7D shows the second damper assembly 220 in mid-extended position; and FIG. 7E shows the second damper assembly 220 in a full-extended position.

As shown in FIGS. 7A-7E, the second damper assembly 220 extends in a rebound stroke similar to its function in the compression stroke, but in the opposite direction. The twintube damper 224 first moves from its full-compressed position, shown in FIG. 7A to its nominal position shown in FIG. 7B, while the monotube damper 22 remains in its full-compressed position. Subsequently, and as shown in FIGS. 7B-7D, the monotube damper 22 extends from its full-compressed position, through a nominal position shown in FIG. 7C, and then to a full-extended position shown in FIG. 7D. After the monotube damper 22 has reached its full-extended position, as shown in FIG. 7D, the twintube damper 224 moves from its nominal position to its full-extended position, as shown in FIG. 7E.

Principle of Operation—Compression (from Damper Extended Position to Nominal Position):

When the first rod 30 in its fully extended position, and compression movement is starting: the characteristic of damping of the second piston 84 is weaker than the first piston 50. With the compression movement, starting from the extended position (either from full-extended or from mid-extended)—till nominal position, the second piston 84 is not reinforced by the compression enhancement (i.e. by the second compressive member 106 with second seal 108 for the second piston 84 in first twintube damper 24; or by the third compressive member 206 with third seal 208 for second base valve 296 in second twin tube damper 224)—then the restriction of the second piston 84 is less than the valve restriction of the first piston 50. Thus, a first damping level is realized by moving the first tube 40. This valve characteristic continues until the first tube 40 reaches its nominal position. When the first tube 40 reaches its nominal position, the second piston 84 is supported by the compression enhancement (i.e. by the second compressive member 106 with second seal 108 for the second piston 84 in first twintube damper 24; or by the third compressive member 206 with third seal 208 for second base valve 296 in second twin tube damper 224), then the characteristic of the second piston 84 is changed. It is stronger than the valve characteristic of the first piston 50. In this configuration, a second level of damping is engaged.

Compression hydraulic balance requirement (from damper full extended position to nominal position): valve restriction of the second piston 84 (unsupported by compression enhancement)+valve restriction of the base valve 96, 296<valve restriction of the first piston 50.

Principle of Operation—Compression (from Damper Nominal Position to Full-Compressed):

Starting from the nominal position, during compression stroke—a second damping level is realized by moving of the first rod 30 relative to the first tube 40 of the monotube damper 22. The first piston 50 is weaker than the second piston 84. This enables the first piston 50 to reach the full-compressed position in the monotube. In the range of relatively small car body displacements from nominal position (low damping forces), damping is only provided by fluid flow through the first piston 50 in the monotube damper 22. After the first rod 30 reaches a full-compressed position, a third level of damping by is engaged by the second piston 84, supported by compression enhancement. There are two options (two concepts) for realizing second level of damping. Those two concepts correspond to the first twintube damper 24 and the second twintube damper 224.

In the first twintube damper 24, the third level of compression damping is realized through the first base valve 96 plus compression damping of second piston 84 with compression enhancement from the second compressive member 106 with second seal 108. Thus the strengthened second piston 84 is engaged and performs together with first base valve 96 to provide damping for the remaining displacement of car body (high damping forces in compression).

In the second twintube damper 224, the third level of damping is realized through the second piston 84 and the second base valve 296 with compression enhancement from the third compressive member 206 with the third seal 208. Thus, the strengthened base valve 296 is engaged and performs together with the second piston 84 to provide damping for the remaining displacement of car body (high damping forces in compression).

Compression hydraulic balance requirement (from damper nominal position to full compressed position): valve restriction of the first piston 50<valve restriction of the second piston 84 (supported by compression enhancement)+valve restriction of the base valve 96, 296.

Rebound (from Damper Compressed Position to Nominal Position):

After the first rod 30 reaches a fully compressed position, and rebound movement is starting: the valve restriction characteristic of the second piston 84 is weaker than the first piston 50. For the first tube 40 rebound movement, starting from the compressed position, (either from full-compressed or from mid-compressed) to the nominal position, the second piston 84 is not reinforced by the first compressive member 102 with the first seal 104. In this configuration, the restriction on the second piston 84 is less than the valve restriction of the first piston 50. Thus, the first damping level is realized then by the second piston 84 (moving of the first tube 40). This valve restriction characteristic of the second piston 84 continues until the first tube 40 reaches the nominal position. When the first tube 40 reaches its nominal position, the second piston 84 damping characteristic is changed due to reinforcement by the first compressive member 102 with the first seal 104. At this time, the damping characteristic of the second piston 84 increases. It becomes stronger than the valve restriction of the first piston 50. In this configuration, a second level of damping is engaged.

Rebound hydraulic balance requirement (from damper full compressed position to nominal position): the valve restriction of the second piston 84 (unsupported by the first compressive member 102)<the valve restriction of the first piston 50.

Rebound (from Damper Nominal Position to Full-Extended):

Starting from nominal position, during rebound stroke—second damping level is realized by moving the first rod 30. In this configuration, the first piston 50 is weaker than the second piston 84. This enables the first piston 50 to reach the full-extended position in the monotube. In the range of relatively small car body displacements from nominal position (low damping forces), damping is only provided by the valve restriction of the first piston 50 in the monotube damper 22. After the first rod 30 reaches full-extended position, a third level of damping is engaged. The second piston 84, supported by the first compressive member 102 with the first seal 104, is engaged and performs damping for further displacement of the car body (with high rebound damping forces).

Rebound hydraulic balance requirement (from damper nominal position to full extended position): valve restriction of the first piston 50<valve restriction of the second piston 84, supported by the first compressive member 102 with the first seal 104).

Starting from the nominal position, damping of the telescopic damper is realized: in a first level of damping by the first piston 50 (as shown FIGS. 3B-3D, 4B-4D, 6B-6D and 7B-7D), and in a second level of damping by the second piston 84 and the base valve 96, 296 (in compression). This may be similar to a conventional twin-tube damper, except that second piston 84 in the damper assembly 20, 220 of the present disclosure has a variable characteristic—for half of the rebound stroke (starting from full-compressed) of the first tube 40, the second piston 84 is weaker than the first piston 50, until nominal position is reached. After that, and for the remainder of the rebound stroke, the second piston 84 is stronger than the valve restriction of the first piston 50. For the first half of the compression stroke (starting from full-extended), the second piston 84 is weaker than the first piston 50 (until nominal position is reached), and for the remainder of the compression stroke, second piston 84 is stronger than the valve restriction of the first piston 50. Strengthening of the second piston 84 is provided by the enhancements—in the rebound direction by the first compressive member 102 with the first seal 104 (starting from the nominal position of the first tube 40), and in the compression direction by the compression enhancement (i.e. by the second compressive member 106 with the second seal 108 for the second piston 84 in first twintube damper 24; or by the third compressive member 206 with third seal 208 for second base valve 296 in second twin tube damper 224), also starting from the nominal position of the first tube 40.

It is significant that the characteristic of the second piston 84 is variable depending on the position of the first tube 40 and the direction of movement of the car body.

In nominal position second piston 84 is supported by enhancements from both sides (the first compressive member 102 with the first seal 104 and one of the second compressive member 106 with the second seal 108 or the third compressive member 206 with the third seal 208 for second base valve 296). The fixed position of the enhancement (i.e. the first seal 104, the second seal 108 or the third seal 208 for second base valve 296) in the nominal position is ensured by enhancement spring aids.

With the compression of the first tube 40—starting from the damper nominal position, the second piston 84 is reinforced by the compression enhancement (i.e. the second compressive member 106 with the second seal 108 or the third compressive member 206 with the third seal 208 for second base valve 296). With the rebound movement of the first tube 40—starting from the nominal position, the second piston 84 will be reinforced by the first compressive member 102 with the first seal 104.

One or more of the pistons 50, 84 and/or the base valves 96, 296 may be configured for double-sided operation, causing some restriction to fluid flow in one direction and a relatively higher restriction to fluid flow in an opposite direction. For example, one or more of the pistons 50, 84 and/or the base valves 96, 296 may consist of an orifice, one or more clamped deflective discs, and calibrated holes for tuning the amount of restriction to fluid flow over a wide range of damper velocities in the compression stroke and/or the rebound stroke. In some embodiments, each of the pistons 50, 84 and the base valves 96, 296 may be configured for double-sided operation, consisting of one or more orifices, one or more clamped deflective discs, and one or more calibrated holes.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A damper assembly comprising:
a monotube damper and a twintube damper in a telescopic configuration;
the monotube damper including a first tube, a rod disposed at least partially within the first tube and coaxially therewith, and a first piston connected to the rod and slidably disposed within the first tube;
the twintube damper including a second tube and a third tube each disposed coaxially around the monotube damper, the second tube having an upper end and a closed lower end opposite from the upper end, and the third tube disposed within the second tube and defining an annular chamber therebetween;
the twintube damper including a second piston connected to an axial end of the first tube dividing an interior of the third tube into an upper twintube chamber and a lower twintube chamber, the second piston defining a twintube passage providing fluid communication between the upper twintube chamber and the lower twintube chamber;
the twintube damper including a base valve having a base member disposed adjacent to the closed lower end of the second tube and defining at least one base passage therethrough and providing fluid communication between the lower twintube chamber and the annular chamber; and
a seal configured to selectively block fluid flow through one of the twintube passage or the base passage based on an axial position of the first tube relative to the second tube.

2. The damper assembly of claim 1, wherein the seal has an annular shape.

3. The damper assembly of claim 1, wherein the seal is disposed within and adjacent to an interior surface of the third tube.

4. The damper assembly of claim 1, wherein the seal is configured to selectively block fluid flow through the base passage of the base member based on the axial position of the first tube relative to the second tube.

5. The damper assembly of claim 4, further comprising a compressive member located in the lower twintube chamber and extending between the second piston and the seal.

6. The damper assembly of claim 5, wherein the compressive member includes a coil spring.

7. The damper assembly of claim 4, wherein the base member further defines a position-independent base passage that is not blocked by the seal and provides fluid communication between the lower twintube chamber and the annular chamber independent of the axial position of the first tube relative to the second tube.

8. The damper assembly of claim 1, wherein the seal is configured to selectively block fluid flow through the twintube passage of the second piston based the axial position of the first tube relative to the second tube.

9. The damper assembly of claim 8, wherein the seal is disposed in the upper twintube chamber and configured to selectively engage a top face of the second piston to selectively block fluid flow through the twintube passage of the second piston based the axial position of the first tube relative to the second tube.

10. The damper assembly of claim 9, further comprising:
a cap at least partially enclosing an end of the second tube, with the first tube of the monotube damper passing through the cap; and
a compressive member located in the upper twintube chamber and extending between the cap and the seal to bias the seal toward the top face of the second piston.

11. The damper assembly of claim 8, wherein the seal is disposed in the lower twintube chamber and configured to selectively engage a bottom face of the second piston to selectively block fluid flow through the twintube passage of the second piston based the axial position of the first tube relative to the second tube.

12. The damper assembly of claim 11, further comprising a compressive member located in the lower twintube chamber and extending between the base member and the seal.

13. The damper assembly of claim 8, wherein the second piston further defines an invariable twintube passage providing fluid communication between the upper twintube chamber and the lower twintube chamber, and
wherein the invariable twintube passage is not blocked by the seal and provides fluid communication between the upper twintube chamber and the lower twintube chamber independent of the axial position of the first tube relative to the second tube.

14. The damper assembly of claim 1, further comprising:
a cap at least partially enclosing an end of the first tube, with the rod passing through the cap; and
a first ring disposed around the rod and adjacent to the first piston and configured to engage the cap to increase a rebound damping force adjacent to an end of travel position of the rod in a direction outwardly from the first tube.

15. The damper assembly of claim 14, further comprising: a second ring disposed on the rod and adjacent to the first piston opposite the first ring to increase a compression damping force adjacent to an end of travel position of the rod in a direction into the first tube.

16. The damper assembly of claim 1, further comprising:
a cap at least partially enclosing an end of the first tube, with the rod passing through the cap; and
a gas cup disposed within the first tube, with the first piston located between the cap and the gas cup, the gas cup forming a fluid-tight seal with an interior surface of the first tube,
wherein the first piston divides an interior of the first tube into a first chamber and a second chamber, each filled with a liquid, and
wherein the gas cup divides the second chamber from a third chamber containing a gas.

17. The damper assembly of claim 16, wherein the gas cup encloses the third chamber of the first tube to prevent gas from escaping therefrom.

18. A damper assembly comprising:
a monotube damper and a twintube damper in a telescopic configuration;
the monotube damper including a first tube, a rod disposed at least partially within the first tube and coaxially therewith, and a first piston connected to the rod and slidably disposed within the first tube;
the twintube damper including a second tube and a third tube each disposed coaxially around the monotube damper, the second tube having an upper end and a closed lower end opposite from the upper end, and the third tube disposed within the second tube and defining an annular chamber therebetween;
the twintube damper including a second piston connected to an axial end of the first tube dividing an interior of the third tube into an upper twintube chamber and a lower twintube chamber, the second piston defining a twintube passage providing fluid communication between the upper twintube chamber and the lower twintube chamber;
the twintube damper including a base valve having a base member disposed adjacent to the closed lower end of the second tube and defining at least one base passage therethrough and providing fluid communication between the lower twintube chamber and the annular chamber; and
a seal configured to selectively block fluid flow through the twintube passage of the second piston based on an axial position of the first tube relative to the second tube.

19. The damper assembly of claim 18, wherein the seal includes a first seal configured to selectively engage a top surface of the second piston to block fluid flow through the twintube passage, and
wherein the seal includes a second seal configured to selectively engage a bottom surface of the second piston opposite the top surface to block fluid flow through the twintube passage.

20. A damper assembly comprising:
a monotube damper and a twintube damper in a telescopic configuration;
the monotube damper including a first tube, a rod disposed at least partially within the first tube and coaxially therewith, and a first piston connected to the rod and slidably disposed within the first tube;
the twintube damper including a second tube and a third tube each disposed coaxially around the monotube damper, the second tube having an upper end and a closed lower end opposite from the upper end, and the third tube disposed within the second tube and defining an annular chamber therebetween;
the twintube damper including a second piston connected to an axial end of the first tube dividing an interior of the third tube into an upper twintube chamber and a lower twintube chamber, the second piston defining a twintube passage providing fluid communication between the upper twintube chamber and the lower twintube chamber;
the twintube damper including a base valve having a base member disposed adjacent to the closed lower end of the second tube and defining at least one base passage therethrough and providing fluid communication between the lower twintube chamber and the annular chamber; and
a seal configured to selectively block fluid flow through the base passage of the base member based on an axial position of the first tube relative to the second tube.

* * * * *